US006107237A

United States Patent [19]
Wagener et al.

[11] Patent Number: 6,107,237
[45] Date of Patent: Aug. 22, 2000

[54] HOMOGENEOUS METATHESIS/ HETEROGENEOUS HYDROGENATION

[75] Inventors: Kenneth B. Wagener; Mark D. Watson, both of Gainesville, Fla.

[73] Assignee: University of Florida, Gainesville, Fla.

[21] Appl. No.: 09/111,987

[22] Filed: Jul. 8, 1998

Related U.S. Application Data

[60] Provisional application No. 60/052,157, Jul. 10, 1997.

[51] Int. Cl.[7] .............................. B01J 21/08; B01J 23/00; B01J 23/38; B01J 23/46
[52] U.S. Cl. .......................... 502/240; 502/258; 502/261; 502/325; 502/332
[58] Field of Search .................................... 502/240, 258, 502/261, 325, 332

[56] References Cited

U.S. PATENT DOCUMENTS

| | | | |
|---|---|---|---|
| 3,700,745 | 10/1972 | Kovach et al. | 208/134 |
| 3,970,588 | 7/1976 | Taylor et al. | 502/243 |
| 4,134,856 | 1/1979 | Itoh et al. | 502/66 |
| 4,496,758 | 1/1985 | Blewett et al. | 560/112 |
| 4,623,669 | 11/1986 | Meier et al. | 518/719 |
| 4,642,302 | 2/1987 | Wood et al. | 502/332 |
| 4,689,315 | 8/1987 | Anton et al. | 502/241 |
| 4,874,888 | 10/1989 | Shiomi et al. | 502/84 |
| 5,070,064 | 12/1991 | Hsu et al. | 502/325 |
| 5,110,779 | 5/1992 | Hucul | 502/185 |
| 5,146,017 | 9/1992 | Werner et al. | 570/143 |
| 5,356,851 | 10/1994 | Sarrazin et al. | 502/185 |
| 5,539,060 | 7/1996 | Tsunogae et al. | 525/338 |

OTHER PUBLICATIONS

K.R. Brzezinsai, et al., "ADMET Chemistry to Prepare Methoxy Silane Terminated Telechelics", *Polymer Preprints* 39 (1) :591–592, 1998. No Month Available.

C. Le Fevere de Ten Hove, et al., "Engineering of Macromolecular Crystals: Synthesis and Analysis of Linear Polyethylene Incorporating Functional "Impurities" at Long Regular Distances", *Proceedings PMSE* 76:158–159, 1997. No Month Available.

S. J. McLain, et al., "New Routes to Ester and Acid Functionalized Polyethylene", *Proceedings PMSE* 76:246–247, 1997. No Month Available.

J.E. O'Gara, et al., "Acyclic Diene Metathesis (ADMET) Polymerization. Synthesis of Perfectly Linear Polyethylene", *Makromol. Chem. Rapid Commun.* 14:657–662, 1993. No Month Available.

P. Schwab, et al., "A Series of Well–Defined Metathesis Catalysts—Synthesis of [$RuC_{12}$(=CHR') ($PR_3$)$_2$] and its Reactions", *Angew. Chem. Int. Ed. Engl.* 34 (18):2039–2041, 1995. No Month Available.

D.J. Valenti, et al., "Direct Synthesis of Well–Defined Alcohol–Functionalized Polymers via Acyclic Diene Metathesis (ADMET) Polymerization", *Macromolecules* 31(9):2764–2773, 1998. No Month Available.

K.B. Wagener, et al., "ADMET Modeling of Branching in Polyethylene. The Effect of a Perfectly–Spaced Methyl Group", *Macromolecules* 30(21):6688–6690, 1997. No Month Available.

K.B. Wagener, et al., "Metathesis Depolymerization Chemistry as a Means of Recycling Polymers to Telechelics and Fine Organic Chemicals", in *Metathesis Polymerization of Olefins and Polymerization of Alkynes*, Y. Imamoglu (ed.) pp. 309–323, 1998, Kluwer Academic Publishers. No Month Available.

Z. Wu, et al., "Synthesis of Narrow Dispersed Linear Polyethylene and Block Copolymers from Polycyclobutene", *Macromolecules* 27 (23):6700–6703, 1994. No Month Available.

*Primary Examiner*—Elizabeth D. Wood
*Attorney, Agent, or Firm*—Quarles & Brady LLP

[57] ABSTRACT

Addition of catalyst support, such as silica or alumina, to a completed metathesis reaction as a support for the catalyst residue, facilitates quantitative hydrogenation at lower hydrogen pressures.

13 Claims, 5 Drawing Sheets

Acyclic Diene Metathesis (ADMET)
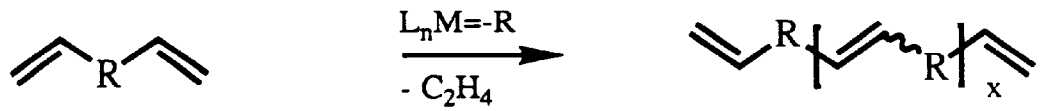
Ring Closing Metathesis (RCM)
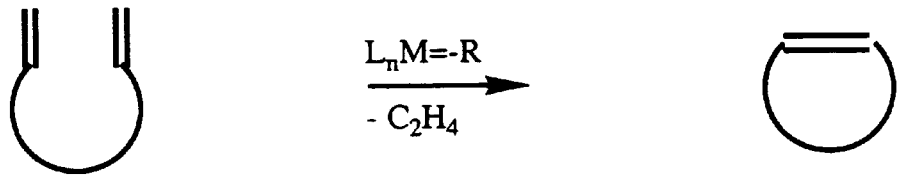
Ring Opening Metathesis Polymerization (ROMP)
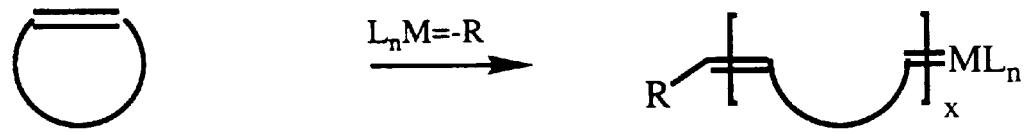
Selective Cross Metathesis
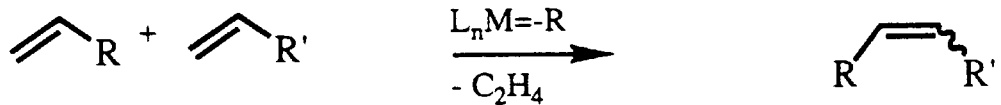
Figure 1. General metathesis reactions.

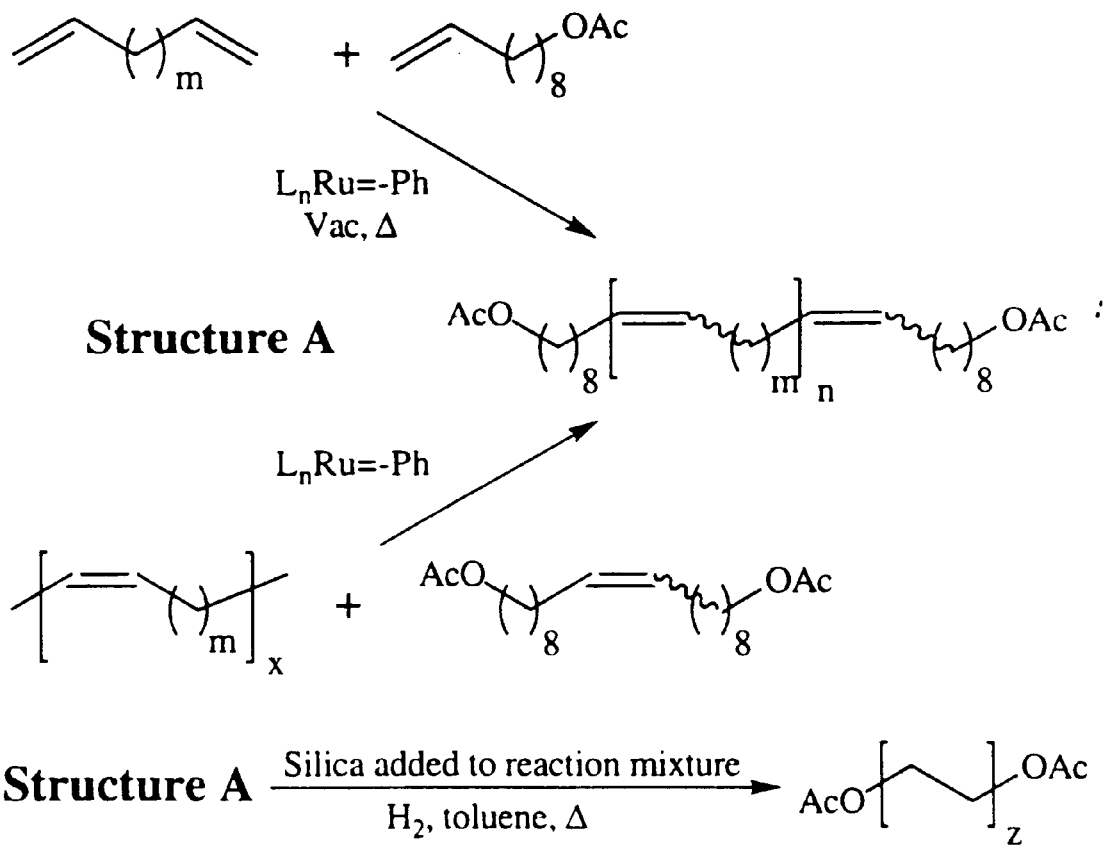
Figure 2. One-pot synthesis of acetoxy-telechelic polyethylene by ADMET polymerization or depolymerization followed by hydrogenation.

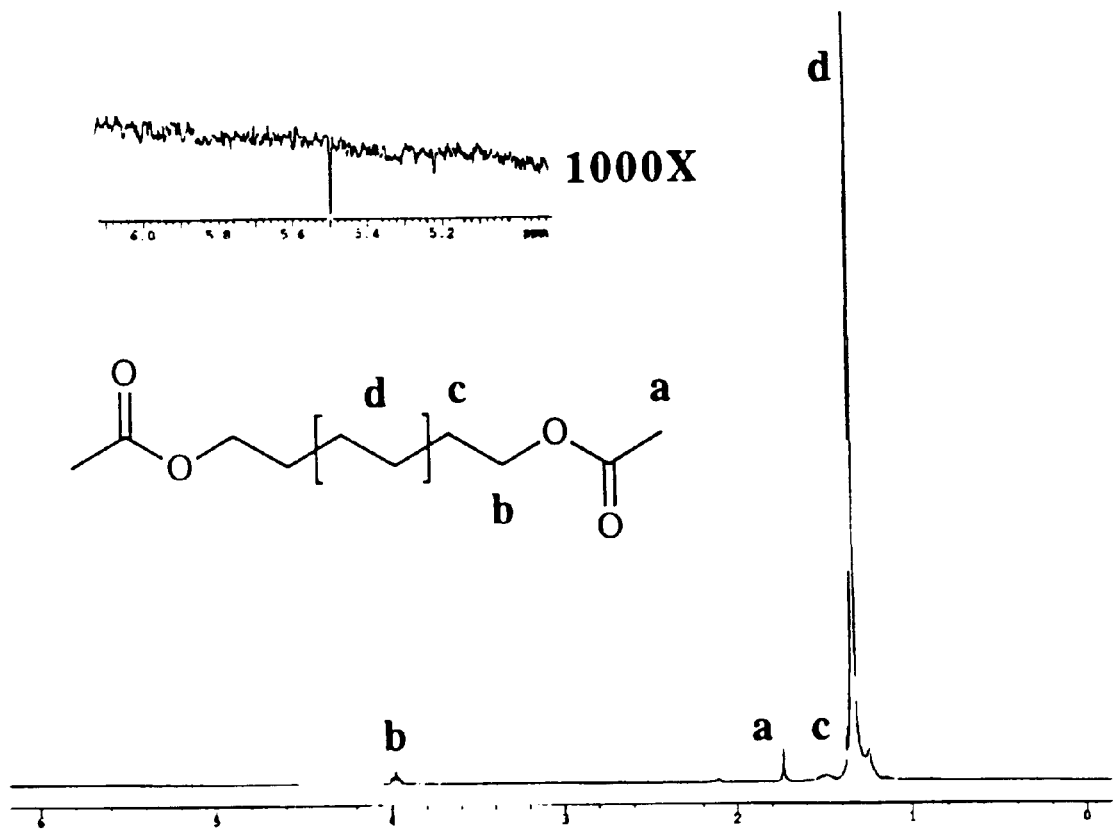
Figure 3. $^1$H NMR of acetoxy-terminated telechelic polyethylene. Multiplet at approx. 2.1 ppm: toluene-d8. Predicted Mn = 1.5 x 10$^3$, Found: 1.5 x 10$^3$(GPC), 1.7 x 10$^3$ ($^1$H NMR end-group analysis).

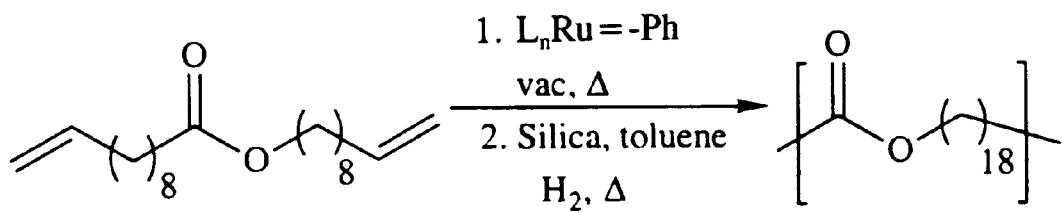
Figure 4. Synthesis of polyester with regular long aliphatic spacer between ester functionality. $Mn = 1.0 \times 10^4$, PDI = 2.3 (GPC).

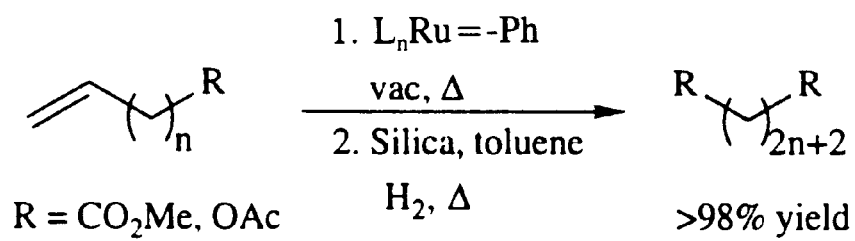
Figure 5. Synthesis of long-chain aliphatic difunctional monomers by metathesis/hydrogenation.

ically described here. Previously prepared catalysts such as ruthenium on alumina may also be used. Hydrogenation is effected by application of hydrogen pressure in the reaction vessel. The resulting polymer is easily separated from the supported hydrogenation catalyst by filtration.

HOMOGENEOUS METATHESIS/ HETEROGENEOUS HYDROGENATION

CROSS-REFERENCE TO RELATED APPLICATIONS

This application claims the benefit of U.S. Provisional application Ser. No. 60/052,157 filed Jul. 10, 1997 now abandoned.

STATEMENT REGARDING FEDERALLY SPONSORED RESEARCH

This invention was made with United States Government support awarded by the National Science Foundation, Division of Materials Research, Grant No. NSF-DMR-9520803. The United States Government has certain rights in this invention.

BACKGROUND OF THE INVENTION

1. Field of the Invention

This invention relates generally to metathesis and hydrogenation chemistry. More particularly, it relates to a method of completing these two types of chemical reactions without the need for isolating/purifying the intermediate product.

2. Background of the Art

Metathesis chemistry has received much attention recently as a means to obtain precise structure control in polymer synthesis. Recent advances include the synthesis of polyolefin and polyolefin-like polymers through two-step procedures involving (1) acyclic diene metathesis (ADMET) polymerization or ring-opening metathesis polymerization (ROMP) followed by (2) hydrogenation. Examples of such polymerizations include perfectly linear polyethylene (O'Gara, J. E., et al., die *Makromomolekulare Chemie* 14:657, 1993; Grubbs, R. H. and W. Zhe, *Macromolecules* 27:6700, 1994), telechelic polyethylene (Hillmyer, M. A., "The Preparation of Functionalized Polymers by Ring-Opening Metathesis Polymerization", Ph.D. Dissertation, California Institute of Technology, 1995), ethylene/vinyl alcohol copolymers (Valenti, D. J. and K. B. Wagener, *Macromolecules* 31:2764, 1998) and polyethylene with precisely spaced alkyl side chains (Valenti, D. J. and K. B. Wagener, *Macromolecules*, 30:6688, 1997). The disclosure of the above publications, and of all the other articles, publications, and patents cited hereafter, are incorporated by reference as if fully set forth herein.

FIG. 1 shows some examples of metathesis reactions. $L_nM=-R$ represents any metathesis catalysts (which are well known in the art) where $L_n$ represents a ligand set, M represents a transition metal, and -R represents a hydrocarbon group. Further, R and R' represent any functionality which does not deactivate the metathesis catalyst. All of these metathesis reactions are useful means for constructing molecules. It may however be desirable that the products be free of carbon—carbon multiple bonds. Conversion of these multiple bonds to single bonds (hydrogenation) can significantly influence physical and chemical properties, biological activity, oxidative stability, etc. Substrates may contain a wide group of functionality. The possible scope of application of this methodology is vast. A few possible applications follow.

The overall result of this process is the formation of carbon—carbon single bonds. This is highly useful in organic synthesis. Unsaturated vegetable oils may be functionalized by cross-metathesis with functionalized olefins and then hydrogenated. Cyclic molecules may be constructed and then hydrogenated. Difunctional monomers with long aliphatic chains, which may otherwise be difficult to product, may easily be synthesized. U.S. Pat. No. 4,496,758 describes metathesis and cross-metathesis of alkenyl esters to produce unsaturated monomers which can be used in polymer synthesis, sex pheromones, etc. U.S. Pat. No. 5,146,017 describes metathesis of partially fluorinated alkenes and states that if the products were to be hydrogenated they would produce highly heat resistant specialty lubricants.

Metathesis chemistry has been shown to be effective in the synthesis of a broad range of polymers. A common feature of all polymers produced via metathesis is unsaturation in the main chain. Oxidative stability can be increased by removal of this unsaturation. Therefore, polymers which may be difficult to synthesize (or even completely inaccessible) by other means may be produced by metathesis and then value added by saturating the double bonds. Other properties may be manipulated such as toughness, thermal stability, permeability, crystallinity, etc.

Currently, metathesis polymers are typically prepared, isolated, and purified prior to hydrogenation. Additional hydrogenating agents are then added and hydrogenation is effected. Disadvantages are loss of product during isolation and purification after the first step, the added effort to conduct reactions in additional vessels, use of additional reagents to effect hydrogenation, and the isolation and purification of the polymer from reagents used in the hydrogenation.

These syntheses typically involve first the synthesis and isolation of unsaturated polymers followed by a second hydrogenation step. Two of the more successful methods for hydrogenation are diimide reduction (Valenti, D. J. and K. B. Wagener, supra, 1997) and catalytic hydrogenation with Crabtree's iridium complex (Hillmyer, M. A., supra, 1995). The Valenti method requires an excess of the hydrogenating species and the Hillmyer method attains complete hydrogenation only if the olefin/catalyst ratio was kept less than or equal to 100:1.

Recently, McLain, et al. (McLain, S. J., et al., *Proceedings PMSE* 76:246, 1997) reported a one-pot procedure for producing ethylene/methyl acrylate copolymers by the ROMP of ester-functionalized cycloolefins using $Cl_2(PCy_3)_2$ Ru=CHCH=$CPh_2$ and then hydrogenating by simply applying hydrogen pressure to the completed ROMP reaction system. The metathesis catalyst residue was assumed to be converted to $RuHCl(PCy_3)_2$ in the presence of hydrogen gas. $RuHCl(PCy_3)_2$ is an effective hydrogenation catalyst. However, hydrogen pressures of at least 400 psi were required to maintain catalytic activity and achieve greater than 99% reduction.

U.S. Pat. No. 5,539,060 describes the one-pot ROMP of cyclic olefins and subsequent hydrogenation without the need for isolation of the polymer from the first step or deactivation of the olefin metathesis catalyst. However, metathesis is effected with a binary catalyst system (e.g. $WCl_6/SnBut_4$) and then another catalyst must be added for hydrogenation. Further, in some cases hydrogen halides can be produced in this process. An acid binder is required in these cases as such by-products can cause corrosion in reaction vessels.

It would be advantageous if olefin metathesis and the subsequent catalytic hydrogenation could be conducted in a single vessel where the only added reagents are low cost support materials and hydrogen gas. It would also be advantageous if quantitative hydrogenation could be achieved under mild conditions (e.g., low to moderate hydrogen pressures and temperatures) and if purification of the final product could be achieved by simple filtration and solvent removal (if used) with minimal loss of product. We have now discovered such a method which surprisingly offers the above advantages and which result in the increased cost efficiency for olefin metathesis and the subsequent catalytic hydrogenation of the metathesis product.

SUMMARY OF THE INVENTION

We have discovered a new method which allows olefin metathesis and catalytic hydrogenation to be conducted in a single vessel. The only added reagents for the hydrogenation are low cost support materials and hydrogen gas.

One aspect of the invention provides a method of performing metathesis and hydrogenation comprising the steps of: combining metathesis reactants and a metathesis catalyst; maintaining reaction conditions so that the metathesis reaction is substantially driven to completion to form metathesis products; adding a catalyst support to the metathesis products to form a mixture; and applying hydrogen to the mixture to thereby reduce the metathesis products; wherein the catalyst support material is selected so that the metathesis catalyst residue is adsorbed onto the surface of the catalyst support material to thereby form a heterogenous catalytic hydrogenation complex. Preferably, no hydrogenation catalyst is added after the metathesis reaction.

It is preferred and advantageous that the metathesis and hydrogenation reactions can be performed in a single vessel.

Preferably, the catalyst support is an inorganic oxide and, most preferably, is selected from the group consisting of silica and alumina.

Preferably, the metathesis catalyst contains a transition metal such as ruthenium.

Another aspect of the invention provides an improved hydrogenation catalyst for reducing products of metathesis reactions comprising a heterogenous catalytic hydrogenation complex having a metathesis catalyst residue adsorbed onto the surface of a catalyst support material. It is preferred that the catalyst support material and the metathesis catalyst be of the kinds described above with respect to the first aspect of the invention.

A still further aspect of the invention provides a method of hydrogenating metathesis products comprising the step of reducing the metathesis products in the presence of hydrogen and the improved hydrogenation catalysts of the above kind.

The objects of the invention, therefore, include providing a method of the above kind:

(a) which permits olefin metathesis and the subsequent catalytic hydrogenation to be conducted in a single vessel;

(b) which allows a single catalyst to be used in the metathesis reaction and the hydrogenation reaction;

(c) which allows the subsequent hydrogenation to be conducted under mild conditions;

(d) which avoids the need for the isolation or purification of products prepared by the metathesis reaction; and (e) which provides increased cost efficiency for olefin metathesis and the subsequent catalytic hydrogenation.

These and still other objects and advantages of the present invention will be apparent from the description below. However, this description is only of the preferred embodiments. The claims should, therefore, be looked to in order to assess the whole scope of the invention.

BRIEF DESCRIPTION OF THE DRAWINGS

FIG. 1 shows some examples of metathesis reactions;

FIG. 2 shows the one-pot synthesis of acteoxy-telechelic polyethylene;

FIG. 3 shows the $^1$H NMR of acteoxy-terminated telechelic polyethylene;

FIG. 4 shows the synthesis of polyester with regular long aliphatic spacer between ester functionality; and FIG. 5 shows the synthesis of long-chain aliphatic difunctional monomers by metathesis/hydrogenation.

DETAILED DESCRIPTION OF THE INVENTION

The invention disclosed here is a method for the completion of two types of chemical reactions, in series, in one reaction vessel. The two reactions are olefin metathesis and the subsequent catalytic hydrogenation of the olefin-containing species produced in the first step. Olefin metathesis reactions and the catalyst(s) employed therein are well known in the art. For example, a number of metathesis catalysts are disclosed in U.S. Pat. Nos. 4,496,758; 5,146,017; 5,539,060; and 5,589,548. The unexpected and surprising advantage of the present invention resides in the combination of the two steps described here: homogeneously catalyzed metathesis followed by heterogeneous catalytic hydrogenation which may be conducted in the same reaction vessel without the need for prior isolation/purification of products prepared in the first step. The heterogenous catalytic hydrogenation is facilitated by adding a support material for the catalyst residue to the metathesis reaction product.

Examples of olefin metathesis reactions which may be conducted in the first step are ring-opening metathesis polymerization (ROMP), acyclic diene metathesis (ADMET) polymerization and depolymerization, and simple olefin metathesis and cross-metathesis. For a thorough, albeit not exhaustive, review of olefin metathesis chemistry involved in the first step, see Ivin, K. J., "Olefin Metathesis and Metathesis Polymerization", Academic press, San Diego, 1997. The result of any of these reactions is the formation of new carbon—carbon double bonds from existing ones. As discussed above, it is often desirable to convert these olefinic linkages to single bonds via hydrogenation.

Upon completion of any of these metathesis reactions, a material which will act as a support for the catalyst residue is added to the reaction mixture. Examples of supports include inorganic oxides such as silica or alumina. It is also envisioned that carbon, titania, magnesia, zirconia, and magnesium chloride would act as suitable support materials. The soluble catalyst residue is adsorbed onto the surface of this support material thus converting it to an insoluble, heterogenous species. The system is then contacted with hydrogen gas and the heterogenous organometallic species allows hydrogenation of the olefin products from the first step to proceed under mild conditions. The hydrogen pressure used is a matter of convenience depending on the equipment used and the reaction rate desired. For example, increasing the hydrogen pressure will result in a higher reaction rate.

We have surprisingly discovered that the addition of silica or alumina, for example, (or other inorganic oxides or chlorides) to a completed metathesis polymerization or depolymerization as a support for the metathesis catalyst complex residue facilitated quantitative hydrogenation at lower hydrogen pressures. Further, this methodology allows for facile isolation of hydrogenated substrates as the catalyst residue is converted to a heterogeneous species. It can therefore be simply filtered away after hydrogenation. We report here preliminary observations of the use of this methodology in the synthesis of telechelic polyethylene, saturated aliphatic polymers with functionality regularly spaced within the polymer backbone, and in the synthesis of small molecules.

Examples of the use of this chemistry are given below. All manipulations of reagents and materials were completed under inert, dry atmosphere. The olefin metathesis catalyst used in these examples was $Cl_2(PCy_3)_2RuCHPh$ (1) wherein P is phosphine, Cy is cyclohexyl, and Ph is phenyl. However, it is envisioned that other metathesis catalysts containing transition metals and, particularly, those metathesis catalysts containing late transition metals like rhodium and iridium would also be suitable. In these examples, hydrogenation was carried out at elevated temperatures as the product polymers are insoluble at room temperature. In other cases in which the final hydrogenated products are soluble at room temperature, it is not necessary to apply heat to achieve hydrogenation. Solvents also are not necessary unless products and/or reactants possess physical properties which limit their intimate contact with the catalyst. Relative molecular weights of the two polymers prepared as described below were determined by high temperature gel permeation chromatography.

General Methodology for Metathesis/Hydrogenation

All manipulations are conducted under inert atmosphere. Olefin-containing substrate(s) and catalyst, $Cl_2(PCy_3)_2Ru=$-Ph (Schwab, P. F., et al., *Angew. Chem. Int. Ed. Eng.* 34:2039, 1995), are combined and reaction is allowed to reach, or is driven to, completion. In the case of terminal olefins as substrates, reaction is driven to completion by removal of ethylene under vacuum.

For example, in the ADMET depolymerization of polybutadiene with disubstituted olefins as chain limiters, substrates are combined with catalyst and the system is simply allowed to reach equilibrium. Upon completion of this reaction, a catalyst support material is intimately mixed with the resulting mixture at which point the catalyst residue is adsorbed onto the surface of the support material. Solvent is added, if necessary, and hydrogen pressure is then immediately applied. In the absence of hydrogen gas, the catalyst residue adsorbed on the surface of the support material promotes tandem metathesis and olefin migration. For example, 1-octene is converted to a complex mixture of straight chain olefins with chain lengths from $C_4-C_{16}$. Therefore, in the reactions reported herein, $H_2$ pressure is applied immediately upon addition of the catalyst support material to prevent these occurrences. If metathesis were allowed to continue on addition of solvent to an unsaturated polymer/catalyst mixture, metathetical molecular weight degradation could occur. Clean products may be isolated by simply filtering away the heterogeneous catalyst residue/support material complex and removing solvent, if used, under reduced pressure.

Example 1
Preparation of Telechelic Polyethylene

Telechelic polyalkenamers may be prepared by ADMET polymerization (Brzezinska, K., et al., *Polymer Preprints*, 39(1):591, 1998) or depolymerization (Wagener, K. B., et al., "Proceedings of the NATO Advanced Study Institute," Ackay, Turkey, September 1995) in the presence of mono- or di-substituted olefins as chain limiters. Upon completion of these reactions, silica may be added and complete hydrogenation achieved at moderate hydrogen pressures to produce telechelic polyethylenes. Examples of these two routes are shown in FIG. 2.

Telechelic polyethylenes were produced in this manner with molecular weights controlled by the mole percent chain limiter added. Polydispersities approached 2 as expected for polymers constructed by step growth mechanisms. A representative $^1H$ NMR spectrum for an acteoxy-terminated polyethylene is shown in FIG. 3.

The unsaturated telechelic precursor to the product shown in FIG. 3 was produced by ADMET polymerization of 1,9-decadiene with 9-decenyl acetate as chain limiter. Complete hydrogenation, within spectroscopic detection limits, could be achieved at 120 psig $H_2$ within 4 hours. Longer reaction times were required at lower hydrogen pressure Telechelic polybutadienes of equivalent molecular weights required longer reaction times presumably due to greater percent unsaturation. Acetate content of the products as calculated from $^1H$ NMR did not decrease from that expected from initial stoichiometry indicating that these groups remain intact throughout the olefin hydrogenation. High-yielding reactions of ester-functionalized monosubstituted olefins to produce the saturated dimers by similar means, reported later in this paper, add further support to this observation.

In an argon-purged dry box, 3 g 1,9-decadiene (5 eq), 0.861 g 9-decenyl acetate (1 eq), and 49 mg catalyst (1) were combined. The solution was heated at 45° C. under slight positive pressure of argon to allow ethylene to escape. The temperature was slowly ramped to 60° C. and after approximately 2.5 hours, vacuum was applied to drive the reaction to completion. After 24 hours, 5 g silica was added to the telechelic polyoctenamer and thoroughly mixed. This mixture was then exposed to 120 psig $H_2$ for 30 minutes. 30 ml toluene was then introduced and the temperature raised to 90° C. to facilitate stirring. $H_2$ pressure was reapplied and held constant for 4 hours after which time reaction is complete. The pure telechelic polyethylene was isolated in near quantitative yield by simple hot filtration then removal of toluene under reduced pressure. Predicted number average molecular weight, $M_n=1.5\times10^3$ g/mol. Found: $1.5\times10^3$, (GPC, PDI=1.9), $1.7\times10^3$ ($^1H$ NMR end group analysis). Elemental analysis: Calculated: C(82.07%), H(13.64%). Found: C(82.03%), H(13.70%).

Example 2
Polyester with Regular Long Aliphatic Segments

Recently, Penelle, et al. (Le Fevere de Ten Hove, C., and J. Penelle, *J. Proceedings PMSE* 76:158, 1997) reported the synthesis of a polyester with regular long alkyl segments within the polymer backbone by classical condensation of a long chain aliphatic diol with a diacid. Their interest lie in polymer with high polyethylene character. Similar polymers may be prepared by the methodology reported herein. Functionalized diene monomers may be condensed by typical ADMET techniques to produce polyalkenamers with regularly spaced functionality in the backbone. Hydrogenation may then be effected as described above to convert to the desired saturated analogue. The functionality and its spacing in the polymer backbone may easily be varied during monomer synthesis. An example polyester is shown in FIG. 4.

While this method produces polymers with regularly spaced functionality, the orientation of functionality, i.e. head-to-tail, head-to-head, tail-to-tail, is governed by statistics. An alternate route to these polymers involves metathesis of functionalized monoenes followed by hydrogenation to product AA, BB or AB monomers as exemplified in FIG. 5. These monomers can then be polymerized by classical step mechanisms. This means allows for even more regular structures as the functionalities will not only be regular spaced but also regularly oriented.

Traces of products with longer/shorter alkyl chains were observed (GC/MS) presumably due to olefin migration occurring in tandem with metathesis during the initial metathetical coupling reaction. The occurrence of olefin isomerization was reported to occur during the use of the similar catalyst $Cl_2(PCy_3)_2Ru=CHCH=CPh_2$ for ADMET chemistry. This was presumed to be due to the formation of RuH species (Pangborn, A. B., et al., presented at the 207th National Meeting of the American Chemical Society, San Diego, Calif., March 1994; abstract INORG 144). The competing chemistry which produces these trace side products might also be assumed to occur with use of the ruthenium catalyst for other acyclic metathesis chemistry. For example, trace irregularities in spacer length in ADMET polymer repeat units may be present. However, their concentration is significantly low enough as to not be detectable by NMR.

9-decenyl 10-undecenoate (3 g) and 12.7 mg catalyst (1) were combined. The reaction vessel was then exposed to 70° C. under slight positive pressure argon to allow escape of ethylene for 4 hours. Vacuum was then applied for an additional 20 hours to drive the reaction to completion. Silica and toluene were then added and hydrogenation was conducted as in Example 1 above. $M_n=1.0\times10^4$, PDI=2.3 (GPC). Elemental analysis: Calculated: C(76.97%), H(12.24%). Found: C(77.06%), H(12.22%).

Conclusions

The method reported herein is an effective one-pot route for forming saturated carbon—carbon bonds in the synthesis of polymers and small molecules. Addition of a support material for the metathesis catalyst complex residue not only facilitates hydrogenation at low to moderate pressures but also simplifies purification of products. This chemistry can be extended to the synthesis of other polyolefin-like polymers with varied main chain and pendant functionalities. It has also been applied to RCM/hydrogenation of dienes.

We claim:

1. An improved hydrogenation catalyst for reducing products of a metathesis reaction comprising:
    a heterogenous catalytic hydrogenation complex having a metathesis catalyst residue adsorbed onto the surface of a catalyst support material,
    wherein the complex is formed by addition of the catalyst support material to a reaction vessel containing the products of the metathesis reaction and the metathesis catalyst residue.

2. The improved hydrogenation catalyst of claim 1, wherein the catalyst support material is an inorganic oxide.

3. The improved hydrogenation catalyst of claim 2, wherein the inorganic oxide is selected from the group consisting of silica and alumina.

4. The improved hydrogenation catalyst of claim 1, wherein the metathesis catalyst residue contains a transition metal.

5. The improved hydrogenation catalyst of claim 4, wherein the transition metal is ruthenium.

6. A method for making an improved hydrogenation catalyst for reducing products of a metathesis reaction, the method comprising the steps of:
    (A) providing a reaction mixture comprising the products of the metathesis reaction and a metathesis catalyst residue; and
    (B) adding a catalyst support material to the reaction mixture, the catalyst support material being selected so that the metathesis catalyst residue is adsorbed onto the catalyst support material when added to the reaction mixture to form a heterogenous catalytic complex that can catalyze the hydrogenation of the products of the metathesis reaction.

7. The method of claim 6, wherein the catalyst support material is an inorganic oxide.

8. The method of claim 7, wherein the inorganic oxide is selected from the group consisting of silica and alumina.

9. The method of claim 6, wherein the metathesis catalyst residue contains a transition metal.

10. The method of claim 9, wherein the transition metal is ruthenium.

11. The method of claim 6, wherein the step of providing the reaction mixture comprises providing a reaction vessel containing the reaction mixture, and the step of adding the catalyst support material to the reaction mixture comprises adding the support material to the reaction vessel containing the reaction mixture.

12. The method of claim 6, wherein the metathesis reaction is acyclic diene metathesis polymerization.

13. The method of claim 6, wherein the metathesis reaction is ring-opening metathesis polymerization.

* * * * *